United States Patent [19]

Damiano et al.

[11] Patent Number: 5,623,579
[45] Date of Patent: Apr. 22, 1997

[54] AUTOMATED METHOD FOR THE SYSTEMATIC INTERPRETATION OF RESONANCE PEAKS IN SPECTRUM DATA

[75] Inventors: Brian Damiano; Richard T. Wood, both of Knoxville, Tenn.

[73] Assignee: Martin Marietta Energy Systems, Inc., Oak Ridge, Tenn.

[21] Appl. No.: 443,292

[22] Filed: May 17, 1995

Related U.S. Application Data

[63] Continuation of Ser. No. 67,922, May 27, 1993, abandoned.
[51] Int. Cl.$^6$ .............................. G06E 1/00; G06E 3/00; G06F 15/18
[52] U.S. Cl. ................................................. 395/22; 395/21
[58] Field of Search ................... 73/23.34; 382/155–159; 395/20–25, 27

[56] References Cited

U.S. PATENT DOCUMENTS

| | | | |
|---|---|---|---|
| 3,886,333 | 5/1975 | Cohn | 364/527 |
| 4,803,040 | 2/1989 | Gross | 395/915 |
| 4,912,649 | 3/1990 | Wood | 395/23 |
| 4,945,494 | 7/1990 | Penz et al. | 395/22 |
| 4,961,898 | 10/1990 | Bogard et al. | 395/915 |
| 5,012,438 | 4/1991 | Ueno et al. | 364/508 |
| 5,023,045 | 6/1991 | Watanabe et al. | 395/22 |
| 5,078,952 | 1/1992 | Gozoni et al. | 395/22 |
| 5,121,338 | 6/1992 | Lodder | 364/498 |
| 5,121,443 | 6/1992 | Tomlinson | 382/14 |
| 5,165,069 | 11/1992 | Vitt et al. | 395/22 |
| 5,177,994 | 1/1993 | Moriizumi et al. | 73/23.34 |
| 5,200,680 | 4/1993 | Sasaki et al. | 318/571 |
| 5,218,529 | 6/1993 | Meyer et al. | 395/22 |
| 5,267,151 | 11/1993 | Ham et al. | 395/22 |
| 5,306,893 | 4/1994 | Morris et al. | 395/22 |

FOREIGN PATENT DOCUMENTS

| | | |
|---|---|---|
| 4012278A1 | 4/1990 | Germany. |
| 3-154896 | 2/1991 | Japan. |

OTHER PUBLICATIONS

Prepared for the U.S. Nuclear Regulatory Commission Office of Nuclear Regulatory Research; Entitled: *Current Applications Of Vibration Monitoring And Neutron Noise Analysis: Detection And Diagnosis Of Structural Degradation Of Reactor Vessel Internals Resulting From Operational Aging*; by Brian Damiano and Robert C. Kryter; Published Feb., 1990.

Presented at American Society Of Mechanical Engineers; Managed by Martin Marietta Energy Systems, Inc., for the U.S. Department of Energy, Entitled: *Computer Simulation As An Aid In Interpreting Vibration Signatures*; by N.E. Clapp and B. Damiano.

(List continued on next page.)

*Primary Examiner*—Tariq R. Hafiz
*Attorney, Agent, or Firm*—Edward A. Pennington; James M. Spicer; Harold W. Adams

[57] ABSTRACT

A method for spectral signature interpretation. The method includes the creation of a mathematical model of a system or process. A neural network training set is then developed based upon the mathematical model. The neural network training set is developed by using the mathematical model to generate measurable phenomena of the system or process based upon model input parameter that correspond to the physical condition of the system or process. The neural network training set is then used to adjust internal parameters of a neural network. The physical condition of an actual system or process represented by the mathematical model is then monitored by extracting spectral features from measured spectra of the actual process or system. The spectral features are then input into said neural network to determine the physical condition of the system or process represented by the mathematical. More specifically, the neural network correlates the spectral features (i.e. measurable phenomena) of the actual process or system with the corresponding model input parameters. The model input parameters relate to specific components of the system or process, and, consequently, correspond to the physical condition of the process or system.

20 Claims, 1 Drawing Sheet

OTHER PUBLICATIONS

Managed by Martin Marietta Energy Systems, Inc. for the U.S. Department of Energy, Sponsored by O.E.C.D. Nuclear Energy Agency; Entitled: *Investigation Of Neutral Network Paradigms For The Development Of Automatic Noise Diagnostic/Reactor Surveillance Systems;* by Kofi Korsah and Robert E. Uhrig.

Research sponsored by the U.S. Nuclear Regulatory Commission; Entitled: *Modeling and Analysis of Neutron Noise from an Ex-Core Detector at a Pressurized Water Reactor* by Richard T. Wood and Rafael B. Perez; Sponsored by O.E.C.D. Nuclear Energy Agency, May 19-24, 1991.

Progess in Nuclear Energy. vol. 1, pp. 781 to 802. Pergamon Press 1977. Printed in Great Britain; Entitled: *Statistical Algorithm For Automated Signature Analysis Of Power Spectral Density Data,* by K.R. Piety (Research sponsored by The Energy Research and Development Administration).

Progress in Nuclear Energy. vol. 15, pp. 17-26. Pergamon Press 1985. Printed in Great Britain; Entitled: *Long-Term Automated Surveillance Of A Commercial Nuclear Power Plant,* by C. M. Smith and R. C. Gonzalez (Research sponsored by The U.S. Nuclear Regulatory Commission, Office of Nuclear Regulatory Research).

Inter. Neural Network Conf. INCC 90 Paris, Jul. 9-13, 1990; Entitled: *Applications Of Neural Networks To Monitoring And Decision Making In the Operation Of Nuclear Power Plants* by Robert E. Uhrig (Department of Nuclear Engineering, University of Tennessee, Knoxville, TN) pp. 424-427.

International Conference On Availability Improvements In Nuclear Power Plants, Madrid, Spain 1-14 Apr. 1989, Entitled: *Use Of Neural Networks In Nuclear Power Plant Diagnostics,* by Robert E. Ehrig.

Proc. 1990 American Power Conference pp. 895-900; Entitled: *Applications Of Expert Systems And Neural Networks For The Condition Monitoring And Inspection of French Nuclear Power Plants,* by G. Zwingelstein, B. Monnier, B. Georgel (Research and Development Division (France).

Stone & Webster Advanced Systems Development Services AI Review 1990; Entitled: *Integrated Expert Systems for Manufacturing* by David L. Siegel, pp. 43-46.

A paper recommended and approved by the IEEE Power System Engineering Committee of the IEEE Power Engineering Society for presentation at the IEEE/OES 1987 Summer Meeting, San Francisco, California, Jul. 12-17, 1987. Manuscript submitted Aug. 21, 1986; made available for printing Apr. 15, 1987, Entitled: *Automated Load Forecasting Assistant,* by Kamal Jabbour, Jose Fernando Vega Riveros, David Landsbergen and Walter Meyer.

0018-9162/86/0700-0053S0100, Jul. 1986 pp. 53-60; Entitled: *Toast: The Power System Operator's Assistant—Toast a flexible expert system for simulating events in power networks and diagnosing problems, could evolve into an intelligent on-line assistant,* by Sarosh N. Talukdar, Eleri Cardozo, and Luiz V. Leao.

ISA Transactions • Jul. 1966; pp. 297-303; Entitled: *A Survey of Learning Control Systems* by Jerry M. Mendel.

IEEE ASSP Magazine, Apr. 1987 Entitled: *An Introduction to Computing with Neural Nets,* by Richard P. Lippman.

Proceedings Of The IEEE, vol. 78, No. 9, Sep. 1990 Entitled: 30 *Years of Adaptive Neural Networks: Perceptron, madaline, and Backpropagation,* by Bernard Widrow, Fellow, IEE, and Michael A. Lehr.

AIChE Journal • Dec. 1989 • vol. 35, No. 12 Entitled: *A Neural Network Methodology for Process Fault Diagnosis,* by Venkat Venkatasubramanian King Chan pp 1993-2002.

Mathai, "Performance analysis and application of the bidirectional associative memory to industrial spectral signatures"; IJCNN, pp. 33-37 vol. 1, 18-22 Jun. 1989.

Ehrig, "Use of Neural Networks in Power Plant Diagnostics", Int'l Conf on Avail Improvements in Nuclear Power Plants, Apr. 1990, pp. 1-14.

Roh et al, "Thermal Power Production of Nuclear Power Plant using Neural Network and Parity Space Model". IEEE Transactions on Nuclear Science, vol. 38, No. 2 pp. 866-872, Apr. 1991.

AUTOMATED METHOD FOR THE SYSTEMATIC INTERPRETATION OF RESONANCE PEAKS IN SPECTRUM DATA

This invention was made with Government support under contract DE-AC05-84OR21400 awarded by the U.S. Department of Energy to Martin Marietta Energy Systems, Inc. and the Government has certain rights in this invention.

This is a continuation of application Ser. No. 08/067,922, filed on May 27, 1993, now abandoned

FIELD OF THE INVENTION

The invention relates, generally, to a method for systematically relating spectral features to the physical condition of a system or process. More particularly, the invention relates to a method utilizing a mathematical model, a neural network, and a frequency spectrum decomposition algorithm to analyze signals associated with the physical condition of a system or process, such as those associated with nuclear power plants.

BACKGROUND OF THE INVENTION

Spectral signature interpretation is a spectral analysis technique which relates spectral features produced by a specific system or process to specific physical phenomena of the system or process. The analysis allows an individual to monitor the physical condition of a specific system or process by observing and studying spectral features produced by the system or process. Such systems or processes include both rotating machinery, such as pumps, motors, or turbines, and mechanical structures, including nuclear reactor internals and steam generators.

Prior methods for performing spectral signature interpretation have required the assistance of a specialized analyst. A specialized analyst's approach to spectral signature interpretation is subjective in nature and often results in inaccurate and misleading diagnoses. These, and other, factors have hindered the more widespread application of spectral analysis techniques in industry.

Neutron noise analysis is a useful tool for monitoring safety significant phenomena in nuclear power plants, such as excessive fuel vibration within the core, progressive structural degradation of the core barrel and thermal shield in a pressurized water reactor, and interference of the stability margin in a boiling water reactor. Noise analysis techniques are especially attractive in that existing instrumentation can be used without disturbing normal plant operation.

The use of an expert for data analysis is required to properly monitor safety significant phenomena based upon analysis of the spectral features of neutron noise. Consequently, this existing analysis technique is conditioned upon the subjective interpretation of the analyst, and often produces misleading or inaccurate diagnosis of a nuclear power plant's operating status (i.e., normal or abnormal operating conditions).

The use of artificial intelligence techniques as an aid in the maintenance and operation of nuclear power plant systems has been contemplated, and several applications using expert systems currently exist. J. A. Bernard and Takashi Washio, *Expert Systems Applications Within Nuclear Industry*, American Nuclear Society, ISBN 0-89448-0340-0. Specifically, application of neural networks as an aid in the maintenance and operation of nuclear power plant systems has been reported.

R. E. Uhrig, *Use of Neural Networks in Nuclear Power Plant Diagnostics, Trans. Int. Conf. Availability Improvements Nucl. Power Plants*, Madrid, Spain, 10–14 Apr. 1989. Neural computing represents a radical departure from traditional computing methodologies, and has proved useful in pattern recognition, classification, noise filtering, and other applications where traditional computational methods often perform poorly. Alienna J. Maren et al., *Handbook of Neural Computing, Theory and Practice*, ISBN 0-12-546090-2, Academic Press (1990); Phillip D. Wasserman, *Neural Computing, Theory and Practice*, ISBN 0-442-20743-3, Van Nostrand Reinhold (1989). Where conventional techniques are comparable to neural techniques, chip implementations of the latter are often preferable if speed is of prime consideration. Also, because of the interpolative nature of neural networks they are suitable for synthesizing complex functions when trained with sample values. The neural network develops an internal representation of the function in the connect weights, allowing fast analysis of unlearned spectra.

Kofi Korsah and Robert E. Uhrig, for example, use an interweaving back propagation network structure to recognize the shift(s) in the position(s) of the resonances in neutron power spectral density (PSD) data. The position of these resonances define the plant signature, and are related to specific causative mechanisms such as fuel vibrations, core barrel motion, and reactivity feedback effects. *Investigation of Neural Network Paradigms for the development of Automatic Noise Diagnostic/Reactor Surveillance Systems, Symposium on Nuclear Reactor Surveillance and Diagnostics (SMORN VI)*, Gatlingburg, Tenn., Vol.2, 60.001–60.11 (1991).

Prior techniques show that the methodology for recognizing abnormalities in plant signatures typically involves reducing the spectral data into a set of descriptors, and observing changes in these descriptors. C. M. Smith, R. C. Gonzalez and K. R. Piety report the use of statistical pattern recognition techniques to reduce the plant PSD into eight descriptors or descriminants. C. M. Smith and R. C. Gonzalez, *Long-Term Automated Surveillance of a Commercial Nuclear Power Plant, Prog. Nucl. Energy*, 15, 17–26 (1985); K. R. Piety, *Statistical Algorithm for Automated Signature Analysis of Power Spectral Density Data, Prog. Nucl. Energy*, 1, 781–802 (1977).

Korsah and Uhrig use a binary feature signature based on the back propagation neural network paradigm in combination with two statistical descriptors to describe the plant signature. Korsah and Uhrig, supra. R. T. Wood and R. B. Perez describe the PSD data from a PWR in terms of four descriptors by deriving a feedback dynamics model of the neutron PSD from a low-order physical model made stochastic by the Langevin technique. R. T. Wood and R. B. Perez, *Modeling and Analysis of Neutron Noise from an Ex-Core Detector at a Pressurized Water Reactor, Symposium on Nuclear Reactor surveillance and Diagnostic (SMORN VI)*, Gatlinburg, Tenn., Vol. 1, 18.01–18.14 (1991).

U.S. Pat. No. 5,023,045, to Watanabe et al. discloses a diagnostic method for monitoring plant malfunctions. The method utilizes model calculated results to form neural network training sets, a tuned neural network to perform system diagnostics, and spectral data descriptors as neural network input. However, the invention relies on a form of pattern recognition, where the pattern is comprised of coherence measurements (a spectral descriptor), to perform its diagnostic function. As a result, the output of the neural network is an indicator corresponding to one of a limited number of physical situations modeled for neural network training. Additionally, the neural network is used to perform classification, that is, to categorize the pattern formed from the measured signal descriptors as one of several patterns used in the training of the neural network. Further, the spectral descriptors used by Watanabe et al., coherence, measure only the degree of commonality between sensor signals. Moreover, no form of spectral feature extraction is utilized in the method.

Other applications for the use of neural networks in monitoring systems have been disclosed. For example, R. E. Uhrig describes the application of a neural network to recognize and distinguish between normal and abnormal power plant conditions based on patterns of room signals. That is, the neural network is used for pattern recognition to classify a set of signals as either normal or abnormal. *Application of Neural Networks To Monitoring and Decision Making In The Operation Of Nuclear Power Plants, Inter. Neural Network Conf.*, Jul. 9–13, 1990.

A similar pattern recognition system is disclosed by Zwingelstein et al.. The publication describes the application of a neural network to recognize abnormal steam generator signals based on Lissajous figures. As with the Uhrig system, the neural network performs pattern recognition. Although the publication also mentions the application of neural networks for predicative maintenance of rotating machinery by using spectral signals, no specific details or result are provided. *Application of Expert Systems and Neural Networks for Condition Monitoring and Inspection of French Nuclear Power Plants, Proc.* 1990 *American Power Conference.*

Further, West German Patent No. 4,012,278 and Japanese Patent No. 3,154,896 utilize neural networks in diagnostic systems. However, the neural networks are trained by actual data, and do not rely upon data generated by a mathematical model of the system to train the neural network.

The prior art methods discussed above do not provide for a systematic method to facilitate the monitoring of the physical condition of a specific process or system by interpreting the spectral features produced by the process or system, as is accomplished by the subject invention.

SUMMARY OF THE INVENTION

It is an object of the invention to provide a method for monitoring the physical condition of a specific process or system by interpreting the spectral features produced by the process or system.

It is a further object of the invention to provide a method for the systematic interpretation of resonance peaks in spectral data.

It is also an object of the invention to provide a method for spectral signature interpretation that does not require the assistance of a specialized analyst.

it is another object of the invention to utilize a neural network in interpreting the spectral signature of physical phenomena.

It is also an object of the invention to perform diagnosis based upon the spectral features of each measured signal, not just the overall relationships between signals.

It is a further object of the instant invention to systematically utilize a mathematical model, a neural network and a frequency spectrum decomposition algorithm to facilitate the interpretation of spectral signatures.

It is also an object of the invention to use a mathematical model to both form the neural network training set and interpret the measured results.

It is also a further object of the invention to use a frequency decomposition algorithm to both extract essential features from the measured spectra and to reduce the amount of information presented to the neural network.

It is another object of the instant invention to provide a method whereby the frequency spectrum decomposition algorithm results in clearer identification of resonance features, because the effects of overlapping and interference are removed.

It is also an object of the invention to provide an interpretation method that can be applied to any system or process that exhibits a resonance structure in its frequency spectrum.

It is also a further object of the invention to provide a neural network system that does not perform pattern recognition, but instead uses spectral features to estimate the physical condition of the monitored system or process.

It is another object of the invention where the output of the neural network are numerical values that are directly related to the fundamental characteristics or condition of the monitored system or process.

It is also another object of the invention to provide a neural network used for interpolation, that is, the neural network is used to interpolate between the input-output cases making-up the training sets to estimate the model parameters corresponding to the present condition of the monitored system or process.

These and other objects of the invention are achieved by the subject invention for spectral signature interpretation. The method includes the creation of a mathematical model of a system or process. A neural network training set is then developed based upon the mathematical model. The neural network training set is developed by using the mathematical model to generate measurable phenomena of the system or process based upon model input parameters that correspond to the physical condition of the system or process. The neural network training set is then used to adjust internal parameters of a neural network. The physical condition of an actual system or process represented by the mathematical model is then monitored by extracting spectral features from measured spectra of the actual process or system. The spectral features are then input into said neural network to determine the physical condition of the system or process represented by the mathematical model. More specifically, the neural network correlates the spectral features (i.e. measurable phenomena) of the actual process or system with the corresponding model input parameters. The model input parameters relate to specific components of the system or process, and, consequently, correspond to the physical condition of the process or system.

By interpreting spectral signatures based upon the frequency spectrum decomposition algorithm and a neural network trained entirely from a mathematical model of the system or process being studied, the need for a specialized analyst, subjective interpretations, and burdensome calculations are overcome. Other objects, advantages and salient features of the invention will become apparent from the following detailed description, which taken in conjunction with the annexed drawing, disclose a preferred but non-limiting embodiment of the invention.

DETAILED DESCRIPTION OF THE INVENTION

Figure 1:
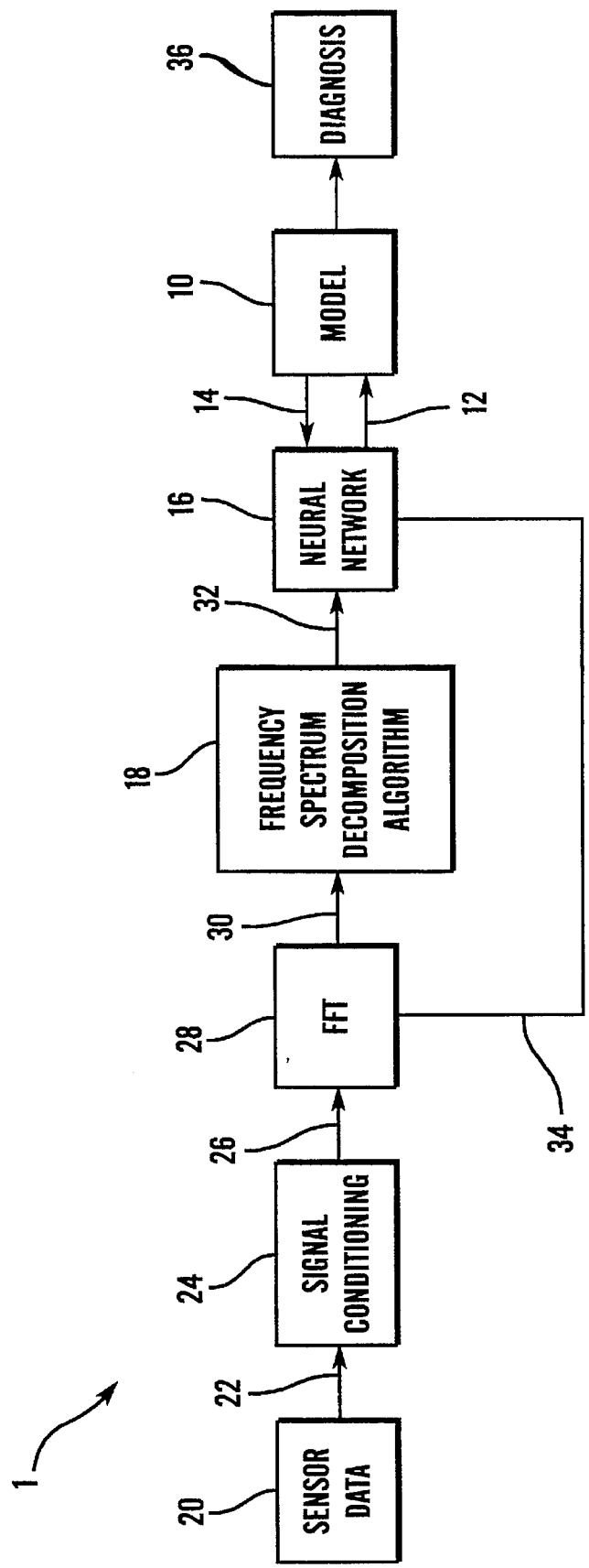
FIG. 1 shows a flow chart of the steps involved in the subject invention.

The invention relates to a systematic method for performing spectral signature interpretation. Spectral signature interpretation is a spectral analysis technique which relates spectral features produced by a specific system or process to specific physical phenomena of the system or process. That is, as a result of the subject invention, a user is able to determine the physical condition of an actual system or process by studying the spectral features produced by the process or system. The method incorporates a mathematical model of the system or process being studied, a neural network created based upon the mathematical model, and a frequency spectrum decomposition algorithm, to analyze specific spectral features of the system or process which are associated with the physical condition of the process or system. The unique combination of these elements results in a method that allows a user to relate spectral features to the physical condition of the monitored system or process.

Briefly, with reference to FIG. 1, the method 1 is outlined in a flow chart. First, a mathematical model 10 of a system or process is created. The model is supplied with model input parameters 12, corresponding to the system or process' physical condition, to generate measurable phenomena of the system or process. The corresponding input parameters and measurable phenomena form a training set 14 which is used to adjust internal parameters of a neural network 16. As will subsequently be discussed in greater detail, the mathematical model 10, the neural network 16, and the frequency spectrum decomposition algorithm 18 are then utilized, as shown in FIG. 1, to analyze the frequency spectra of a system or process and determine the physical condition of the system or process. That is, the subject method, and particularly the neural network, does not perform pattern recognition, but instead uses spectral features to estimate the physical condition of the monitored system or process. This is achieved by providing neural network outputs that are numerical values directly related to the fundamental characteristics or condition of the monitored system or process.

As previously discussed, a mathematical model 10 of the system or process is first required. The mathematical model 10 must be sufficiently detailed to accurately describe all significant measurable phenomena of the system or process. Measurable phenomena, as used during the course of this disclosure, refers to measurable characteristics relating to the physical condition of a process or system. Typically, measurable phenomena are the characteristics of the resonance frequencies produced by the system or process.

As the mathematical model 10 is utilized, model input parameters 12 directly affect the characteristics of the measurable phenomena generated by the mathematical model. The model input parameters 12 are directly related to specific components of the analyzed system or process, and, consequently, correspond to the physical condition of the system or process. As a result, the mathematical model provides relationships between the measurable phenomena and the input parameters, where the input parameters correspond to the physical condition of the system or process being analyzed.

The mathematical model 10 is used to generate a series of data sets. Each data set consists of the model input parameters 12 and the corresponding calculated characteristics of the measurable phenomena. The series of data sets contain model input parameters 12 spanning the range of the physical conditions expected to be encountered by the system or process. The calculated data sets form training sets 14 for the neural network. Software for the development of neural networks is readily available. For example, the preferred embodiment of the subject invention uses software developed by Neural Ware of Pittsburgh, Pa. The software is entitled "Neural Professional Training II-Plus", and can be used with any personal computer having sufficient memory and speed.

During neural network training, the generated measurable phenomena are used as the neural network input and the corresponding model input parameters are the neural network output. Once the neural network training is complete, the neural network 16 contains all of the significant information available from the mathematical model 10. That is, the neural network 16 contains model input parameters relating to all physical conditions of the process or system, as well as the corresponding characteristics of the measurable phenomena. Therefore, when the completely trained neural network 16 is presented with a set of measurable phenomena, the trained neural network 16 will return a corresponding set of model input parameters 12 that are directly related to specific components of the system or process being analyzed. As stated above, the corresponding set of model input parameters 12 provided by the neural network 16 are numerical values that can be used in conjunction with the mathematical model 10 to determine the physical condition of the process or system. Thus, changes in the model input parameters 12, as estimated by the neural network 16, indicate where changes have occurred in the system or process. This interpretation is based entirely on the results of the mathematical model 10 of the system or process and does not rely on the intuition or judgment of an analyst.

Additionally, the neural network is used for interpolation. That is, the neural network is used to interpolate between the input-output cases making-up the training sets to estimate the model parameters corresponding to the present condition of the monitored system or process. This extends the subject invention beyond neural networks simply performing classification by categorizing the pattern formed from the measured signal descriptors as one of several patterns used in the training of the neural network.

The frequency spectrum decomposition algorithm 18 is used to extract pertinent measurable values from the measured frequency spectra of the process or system being analyzed. The details of the algorithm are disclosed in the inventors' own Ph.d dissertation (See December, 1990 Ph.d Thesis by Richard T. Wood entitled *A Neutron Noise Diagnostic Methodology For Pressurized Water Reactors*, The University of Tennessee Central Library, identification number 90BW662). The thesis in its entirety is incorporated herein by reference. The extraction reduces the amount of information presented to the neural network 16 to a manageable quantity. The reduction facilitates practical application of this method, because a wide range of significant features can be monitored without making the size, or the training period, of the neural network prohibitively large. The frequency spectrum decomposition algorithm 18 separates a complicated frequency spectrum, obtained by using standard frequency analysis techniques, into its constituent resonance peaks. Each resonance peak is characterized by four parameters: frequency, amplitude, width, and skewness. These parameters, or some subset representing the measurable phenomena, are presented to the neural network, which subsequently calculates the corresponding physical conditions (i.e., model input parameters) that should produce such a set or measurable phenomena.

FIG. 1 outlines the entire method. A sensor 20 monitors raw signals 22 which are subsequently conditioned 24 to produce filtered signals 26. The filtered signals 26 are then transformed 28 into frequency spectra 30. The transformation to frequency spectra 30 is completed utilizing standard spectral analysis methods (e.g., Fast Fourier Transform ('FFT')). The frequency spectrum decomposition algorithm 18 is then used to decompose the frequency spectra 30 into its composite resonance peaks 32 (i.e., extracted spectral features). The characteristics of some or all of these composite peaks 32, possible along with additional information 34 such as phase relationships between sensor signals, are presented to the trained neural network 16. As previously discussed, the neural network 16 has been trained by information previously generated by the mathematical model 10 of the system or process. The neural network 16 studies the composite resonance peaks 32, and generates a neural network output 12 which, in fact, is a set of model input parameters. The neural network output, if used as an input to the mathematical model, would generate calculated values of measurable phenomena that closely match the characteristics of the composite peaks 32 presented to the neural network 16. Because the neural network output (i.e., model input parameters) is directly related to the physical condition of the system or process, the mathematical model 10 is used to provide a final diagnosis 36 concerning the physical condition of the system or process at the time of the measurement. Thus, this method effectively provides an interpretation of spectral data based on mathematical model results, and not on the intuition or expertise of an analyst.

It should be noted that the subject invention does not rely upon the overall relationship between signals to monitor the process or system, but uses the spectral features of each measured signal to monitor the process or system.

Additionally, the subject invention does not simply perform pattern recognition, but instead uses spectral features to estimate the physical condition of the monitored system or process. By using a neural network having an output given in numerical values, which are directly related to the fundamental characteristics or condition of the monitored system or process, the mathematical model is used to estimate the physical condition and is not limited to physical situations modeled for neural network training. Measurements of the physical condition are enhanced because the neural network is used for interpolation.

The method is primarily intended as a tool for the predictive maintenance of mechanical systems. Such systems include both rotating machinery, such as pumps, motors, or turbines, and mechanical structures, including nuclear reactor internals and steam generators. Additionally, by utilizing an external excitation (e.g., impacting), the instant method could be adapted for processes or systems that are normally not excited during normal operations. This modification would extend the applicability of the instant method to a wide range of structural systems.

Because the method is general, and has the potential to be applied to any system or process that produces a frequency signature exhibiting a resonance structure, a wide variety of potential applications exist. Some of these include, but are not necessarily limited to, interpretation of neutron noise signatures, diagnosis and monitoring of analog electrical circuits, or identification of chemical or nuclear compositions based on spectra obtained from infrared, ultraviolet, or neutron measurements.

While advantageous embodiments have been chosen to illustrate the invention, it will be understood by those skilled in the art that various changes and modifications can be made therein without departing from the scope of the invention as defined in the appended claims.

What is claimed is:

1. A method for spectral signature interpretation comprising the steps of:
    measuring and transforming raw sensor signals of a system into frequency spectra;
    isolating from said frequency spectra a plurality of resonance frequencies corresponding to operating conditions of components within the system;
    developing a neural network from a mathematical model based on modeled resonant frequencies of components of said system, the resonant frequencies being adjusted to characterize the steady state condition of the system;
    feeding the plurality of resonance frequencies into the neural network; and
    outputting from the neural network a diagnosis of the actual physical conditions of said components of the system.

2. A method according to claim 1, wherein said step of measuring and transforming raw sensor signals comprises measuring and transforming sensor signals derived from neutron noise.

3. A method according to claim 2, wherein said isolating step comprises applying said frequency spectra to a frequency spectrum decomposition algorithm.

4. A method according to claim 3, further comprising the step of adjusting internal parameters of said neural network based upon a training set generated by a mathematical model of neutron noise produced by a nuclear power plant.

5. A method according to claim 4, wherein said step of adjusting internal parameters includes the step of forming said training set comprising table sets of model input parameters defining specific components of said nuclear power plant and measurable phenomena generated by said mathematical model based upon input of said model input parameters.

6. A method according to claim 1, wherein the isolating step comprises applying said frequency spectra to a frequency spectrum decomposition algorithm.

7. A method according to claim 1, further comprising the step of forming a training set for the neural network, said training set being generated by said mathematical model to adjust internal parameters of said neural network.

8. A method according to claim 7, wherein said step of forming said training set comprises generating table sets consisting of model input parameters defining specific components of said system and measurable phenomena generated by said mathematical model based upon input of said model input parameters.

9. A method according to claim 1, further comprising the step of applying said parameters representing actual physical conditions of said system in conjunction with said mathematical model to estimate the actual physical condition of said system.

10. A method according to claim 1, wherein said feeding step comprises the step of performing interpolation.

11. A method diagnosing operations of a system having a plurality of components, the method comprising the steps of:
    creating a mathematical model of the system including modeled resonance frequencies of components within the system;
    developing a neural network training set from said mathematical model;
    adjusting internal parameters of a neural network based upon said neural network training set;
    extracting spectral features which include actual resonance frequencies from measured spectra of the system during operation;

inputting said actual spectral features into said neural network to determine actual physical conditions of the system.

12. A method according to claim 11, wherein said step of creating said mathematical model comprises creating a mathematical model of a nuclear power plant, the model including the modeled resonance frequencies.

13. A method according to claim 12, wherein said step of extracting spectral features comprises extracting spectral features of neutron noise produced by said nuclear power plant from measured spectra of said neutron noise.

14. A method according to claim 13, wherein said said step of extracting spectral features further comprises extracting spectral features from measured spectra of said neutron noise based upon a frequency spectrum decomposition algorithm.

15. A method according to claim 14, further comprising the step of adjusting internal parameters of said neural network based upon training sets generated by a mathematical model of said neutron noise produced by said nuclear power plant.

16. A method according to claim 15, wherein said step of developing said neural network training set comprises developing a neural network training set comprising model input parameters defining specific components of said nuclear power plant and measurable phenomena generated by said mathematical model based upon input of said model input parameters.

17. A method according to claim 11, wherein said step of extracting spectral features comprises using a frequency spectrum decomposition algorithm.

18. A method according to claim 11, wherein said step of developing said neural network training set comprises developing a neural network training set of model input parameters defining specific components of said system or process and measurable phenomena generated by said mathematical model based upon input of said model input parameters.

19. A method according to claim 11, further comprising the step of generating numerical values representing actual physical conditions of said system or process through said neural network, said numerical values are used in conjunction with said mathematical model to estimate the actual physical condition of said system or process.

20. A method according to claim 11, said step of inputting said spectral features into said neural network comprises the step of performing interpolation.

\* \* \* \* \*